(12) United States Patent
De Jong

(10) Patent No.: US 7,197,596 B2
(45) Date of Patent: Mar. 27, 2007

(54) COMPUTER ARRANGEMENT USING NON-REFRESHED DRAM

(75) Inventor: Eduard Karel De Jong, Amsterdam (NL)

(73) Assignee: Sun Microsystems, Inc., Menlo Park, CA (US)

( * ) Notice: Subject to any disclaimer, the term of this patent is extended or adjusted under 35 U.S.C. 154(b) by 0 days.

(21) Appl. No.: 11/345,519

(22) Filed: Feb. 2, 2006

(65) Prior Publication Data
US 2006/0129756 A1    Jun. 15, 2006

Related U.S. Application Data

(62) Division of application No. 10/148,927, filed as application No. PCT/NL00/00901 on Dec. 6, 2000, now Pat. No. 7,020,740.

(30) Foreign Application Priority Data
Dec. 6, 1999   (NL)  .................... PCT/NL99/00746

(51) Int. Cl.
    *G06F 12/00*    (2006.01)
(52) U.S. Cl. .................... 711/105; 711/106; 365/222
(58) Field of Classification Search ................ 711/105, 711/106; 365/222
See application file for complete search history.

(56) References Cited

U.S. PATENT DOCUMENTS

| | | | |
|---|---|---|---|
| 4,425,642 A | 1/1984 | Moses et al. | |
| 4,582,985 A | 4/1986 | Lofberg | |
| 4,853,522 A | 8/1989 | Ogasawara | |
| 4,874,935 A | 10/1989 | Younger | |
| 4,921,278 A | 5/1990 | Shiang et al. | |
| 4,930,129 A | 5/1990 | Takahira | |
| 4,953,160 A | 8/1990 | Gupta | |
| 5,057,997 A | 10/1991 | Chang et al. | |
| 5,148,546 A | 9/1992 | Blodgett | |
| 5,204,663 A | 4/1993 | Lee | |
| 5,204,897 A | 4/1993 | Wyman | |
| 5,283,885 A | 2/1994 | Hollerbauer | |
| 5,404,377 A | 4/1995 | Moses | |
| 5,446,901 A | 8/1995 | Owicki et al. | |
| 5,452,431 A | 9/1995 | Bournas | |

(Continued)

FOREIGN PATENT DOCUMENTS

DE    4126213    2/1993

(Continued)

OTHER PUBLICATIONS

Sun Microsystems, Inc., "Java Card Runtime Environment (JCRE) 2.1 Specification," Final Revision 1.0, Feb. 24, 1999.

(Continued)

*Primary Examiner*—Hiep T. Nguyen
(74) *Attorney, Agent, or Firm*—Finnegan, Henderson, Farabow, Garrett & Dunner LLP

(57) ABSTRACT

A computer arrangement with a processor (5) and at least one memory unit (7, 9, 11, 13) connected to the processor (5) and including dynamic random access memory (13), wherein the computer arrangement is arranged to use but not to refresh at least part of the dynamic random access memory (13) while running a program.

24 Claims, 4 Drawing Sheets

U.S. PATENT DOCUMENTS

| | | | |
|---|---|---|---|
| 5,453,602 | A | 9/1995 | Hanada |
| 5,469,559 | A | 11/1995 | Parks et al. |
| 5,479,509 | A | 12/1995 | Ugon |
| 5,481,715 | A | 1/1996 | Hamilton et al. |
| 5,511,176 | A | 4/1996 | Tsuha |
| 5,534,372 | A | 7/1996 | Koshizuka et al. |
| 5,544,246 | A | 8/1996 | Mandelbaum et al. |
| 5,594,227 | A | 1/1997 | Deo |
| 5,649,118 | A | 7/1997 | Carlisle et al. |
| 5,649,188 | A | 7/1997 | Nomura et al. |
| 5,657,379 | A | 8/1997 | Honda et al. |
| 5,721,781 | A | 2/1998 | Deo et al. |
| 5,742,756 | A | 4/1998 | Dillaway et al. |
| 5,754,649 | A | 5/1998 | Ryan et al. |
| 5,768,385 | A | 6/1998 | Simon |
| 5,781,723 | A | 7/1998 | Yee et al. |
| 5,790,489 | A | 8/1998 | O'Connor |
| 5,802,519 | A | 9/1998 | De Jong |
| 5,832,119 | A | 11/1998 | Rhoads |
| 5,862,117 | A | 1/1999 | Fuentes et al. |
| 5,869,823 | A | 2/1999 | Bublitz et al. |
| 5,881,152 | A | 3/1999 | Moos |
| 5,884,316 | A | 3/1999 | Bernstein et al. |
| 5,889,868 | A | 3/1999 | Moskowitz et al. |
| 5,894,550 | A | 4/1999 | Thiriet |
| 5,896,393 | A | 4/1999 | Yard et al. |
| 5,905,798 | A | 5/1999 | Nerlikar et al. |
| 5,912,453 | A | 6/1999 | Gungl et al. |
| 5,915,027 | A | 6/1999 | Cox et al. |
| 5,930,363 | A | 7/1999 | Stanford et al. |
| 5,940,363 | A | 8/1999 | Ro et al. |
| 6,005,940 | A | 12/1999 | Kulinets |
| 6,052,690 | A | 4/2000 | De Jong |
| 6,055,615 | A | 4/2000 | Okajima |
| 6,058,483 | A | 5/2000 | Vannel |
| 6,094,656 | A | 7/2000 | De Jong |
| 6,094,705 | A | 7/2000 | Song |
| 6,168,207 | B1 | 1/2001 | Nishizawa |
| 6,173,391 | B1 | 1/2001 | Tabuchi et al. |
| 6,182,158 | B1 | 1/2001 | Kougiouris et al. |
| 6,212,633 | B1 | 4/2001 | Levy et al. |
| 6,220,510 | B1 | 4/2001 | Everett et al. |
| 6,241,153 | B1 | 6/2001 | Tiffany, III |
| 6,250,555 | B1 | 6/2001 | Inamoto |
| 6,257,486 | B1 | 7/2001 | Teicher et al. |
| 6,257,490 | B1 | 7/2001 | Tafoya |
| 6,292,874 | B1 | 9/2001 | Barnett |
| 6,310,956 | B1 | 10/2001 | Morito et al. |
| 6,311,186 | B1 | 10/2001 | MeLampy et al. |
| 6,311,280 | B1 | 10/2001 | Vishin |
| 6,325,285 | B1 | 12/2001 | Baratelli |
| 6,349,336 | B1 | 2/2002 | Sit et al. |
| 6,374,355 | B1 | 4/2002 | Patel |
| 6,385,645 | B1 | 5/2002 | De Jong |
| 6,480,831 | B1 | 11/2002 | Cordery et al. |
| 6,480,935 | B1 | 11/2002 | Carper et al. |
| 6,484,946 | B2 | 11/2002 | Matsumoto et al. |
| 6,535,997 | B1 | 3/2003 | Janson et al. |
| 6,546,112 | B1 | 4/2003 | Rhoads |
| 6,572,025 | B1 | 6/2003 | Nishikado et al. |
| 6,608,911 | B2 | 8/2003 | Lofgren et al. |
| 6,742,712 | B1 | 6/2004 | Kawaguchi et al. |

FOREIGN PATENT DOCUMENTS

| | | |
|---|---|---|
| DE | 4242247 A1 | 6/1994 |
| DE | 19600081 | 7/1997 |
| EP | 0190733 | 8/1986 |
| EP | 0251861 A1 | 1/1988 |
| EP | 0466969 | 1/1992 |
| EP | 0581317 A2 | 2/1994 |
| EP | 0666550 | 8/1995 |
| EP | 0674295 A1 | 9/1995 |
| EP | 0723226 | 7/1996 |
| EP | 0849734 A2 | 6/1998 |
| EP | 0864996 A2 | 9/1998 |
| EP | 0 893 752 A1 | 1/1999 |
| EP | 0 917 152 A1 | 5/1999 |
| FR | 2776153 | 9/1999 |
| JP | 01277993 A | 11/1989 |
| JP | 02156357 A | 6/1990 |
| JP | 05089303 A | 4/1993 |
| JP | 09326046 A | 6/1999 |
| JP | 200015886 | 1/2000 |
| JP | 2001126046 | 5/2001 |
| WO | WO 87/07062 | 11/1987 |
| WO | WO 89/02140 | 3/1989 |
| WO | WO 94/10657 | 5/1994 |
| WO | WO 97/41562 | 11/1997 |
| WO | WO 98/19237 | 5/1998 |
| WO | WO 98/37526 | 9/1998 |
| WO | WO 99/16030 | 9/1998 |
| WO | WO 99/35791 | 7/1999 |
| WO | WO 99/38162 | 7/1999 |

OTHER PUBLICATIONS

Tetsushi, Hikawa and Yukihiro, Ukai, "Storage Medium and Storage Medium Driving Device," Patent Abstracts of Japan, JP 11161551 (Jun. 18, 1999).

Chan, "Infrastructure of Multi-Application Smart Card," http://home.hkstar.com/~alanchan/papers/multiApplicationSmartCard/, Jul. 25, 2002.

Cordonnier, et al., "The Concept of Suspicion: A New Security Model for Identification Management in Smart Cards," http://inforge.unil.ch/isdss97/papers/48.htm, (1997).

Daniels, John et al., "Strategies for Sharing Objects in Distributed Systems," JOOP, Object Designers Ltd., Uk., pp. 27-36.

Gong, L. et al., "Going Beyond the Sandbox: An Overview of the New Security Architecture in the JavaDevelopment Kit 1.2" Proc. Usenix Sym. Internet Technologies and Systems, Dec. 8, 1997.

Islam, et al., "A Flexible Security Model for Using Internet Content," IBM Thomas J. Watson Research Center Papers, 'Online!', Jun. 28, 1997, from http://www.ibm.com/java/education/flexsecurity.

Lee, Chan Y., "Detecting Out-Of-Range References," http://127.0.0.1:8080/vtopic/isapi?action+View&VdkVgwKev=%2E@%2E%2Fdata%2F1 993%2F, Jul. 24, 2002.

Phillips Semiconductor, "Designers Offered First 16-Bit Smart Card IC Architecture with Development Tools," Press Release, Jul. 25, 2002.

Ritchey, Tim, "Advanced Topics: The Java Virtual Machine," Java!, Chapter 14, pp. ii-x and 325-346, Sep. 22, 1995.

Sun Microsystems, Inc., "Java Card™ 2.0 Language Subset and Virtual Machine Specification," Oct. 13, 1997, Revision 1.0 Final.

Sun Microsystems, Inc., "Java Card™ 2.0 Programming Concepts," Oct. 15, 1997, Revision 1.0 Final.

"Sun Microsystems Announces JAVACARD API," Business Wire, Oct. 1996.

Sun Microsystems, Inc., "Java Card Runtime Environment (JCRE) 2.1 Specification—Draft 2," Dec. 14, 1998.

"Java Card Applet Developer's Guide," Revision 1.12, Aug. 19, 1998, Sun Microsystems, Inc.

Sun Microsystems, Inc., "Java Card™ 2.0 Application Programming Interfaces," Oct. 13, 1997, Revision 1.0 Final.

K. Matsui, et al., "Video-Steganography: How to Secretly Embed a Signature in a Picture," IMA Intellectual Property Project Proceedings, vol. 1, Issue 1, pp. 187-206 (Jan. 1994).

COMPUTER ARRANGEMENT USING NON-REFRESHED DRAM

This is a divisional application of application Ser. No. 10/148,927, filed Oct. 9, 2002 now U.S. Pat. No. 7,020,740, which is a 371 application of PCT/NL00/00901 filed Dec. 6, 2000, both of which are incorporated herein by reference.

FIELD OF THE INVENTION

The present invention relates to a computer arrangement comprising a processor and at least one memory unit connected to the processor and comprising dynamic random access memory having a predetermined retention time, the computer arrangement being arranged for running a predetermined program on the processor while temporarily storing data during a storage time in at least part of the dynamic random access memory.

PRIOR ART

EP-A-0 917 152 discloses a semiconductor circuit and a method of controlling such a circuit. The circuit comprises dynamic random access memory (DRAM). The object is to decrease the frequency of times of refreshing operations of such DRAM in order to achieve power consumption. This object is obtained refreshing only those rows in the DRAM that contain valid data used by the logic portion of the circuit. DRAM portions that do not contain valid data are not refreshed thus saving time and power.

Similar techniques of refreshing only those portions of DRAM that contain valid data are disclosed by U.S. Pat. Nos. 5,1148,546, 5,283,885, and 5,469,559.

OBJECTIVES

The general objective of the present invention is to provide a method and arrangement that provide an even more effective use of DRAM and, ultimately, avoid any refreshment of DRAM.

Traditionally, all smart cards have chips which are implemented with static random access memory (RAM) cells. By using memory array imaging techniques it may be possible to maliciously extract data from such RAM. Therefore, in an embodiment, it is an objective of the invention to apply such DRAM in smart cards to reduce the risk of maliciously break-in into RAM cells by scanning data retained therein.

DESCRIPTION OF THE INVENTION

Therefore, in accordance with the invention the storage time is shorter than the retention time and the computer arrangement is arranged to use but not to refresh the at least part of the dynamic random access memory comprising the data during the running of the program.

The invention is based on the observation that in specific fields of use, notably (contactless) smart cards, the inherent time requirements are such that limited retention without refresh of data by DRAM cells is no longer an obstacle to effective use thereof.

A DRAM cell typically utilizes a single (MOS) transistor whereas a traditional RAM cell of the static type requires four or more (MOS) transistors. In accordance with the invention, part of the DRAM is not refreshed while running a program. Since no refresh operation is used the time that data is retained in the DRAM cells depends on the electrical capacity of the DRAM cell. The retention time depends on the design parameters of the cell. In many smart card applications, processing of data must be completed in less than 150 ms. DRAM cells having a retention time of for instance a few hundreds of ms can easily be designed.

Thus, data necessary for carrying out some computations can be retained long enough in DRAM cells properly designed. Since after the retention time, all data will be lost, the invention provided improves security by increasing the difficulty of maliciously extracting data from the memory.

One way in which the invention may be implemented is by not connecting the at least part of the dynamic random access memory to refresh circuitry. An alternative is to disable a refresh function of existing refresh circuitry for the at least part of the dynamic random access memory.

Since a single DRAM cell requires less space on a silicon chip than does one static RAM cell, using the same size of chip area results in having a larger memory capacity. Alternatively, the same number of necessary memory cells results in a smaller silicon area required. This is especially important for smart cards where RAM is typically the relatively largest area component. Therefore, the present invention also results in the possibility of reducing costs of smart card chips.

Therefore, the present invention also relates to a smart card provided with a computer arrangement as defined above.

However, the invention does not only relate to smart cards or the like but also to further computers like terminals arranged to communicate with such cards.

To that end the present invention relates to a terminal provided with a terminal processor and a terminal communication interface connected to said terminal processor and arranged for communicating with a computer arrangement comprising a processor, a communication interface and at least one memory unit, said communication interface and said at least one memory unit being connected to said processor, said at least one memory unit comprising memory for storing a computer program with a predetermined sequence of instructions and dynamic random access memory, said computer arrangement being arranged to use but not to refresh at least part of said dynamic random access memory while running said program, wherein said terminal processor is arranged to carry out the following steps:

(a) emulating the computer program;
(b) analyzing time period necessary for the processor of the computer arrangement to carry out each instruction of the sequence of instructions and determining all retention times necessary for the processor to temporarily store data in the at least part of the dynamic random access memory during carrying out the sequence of instructions;
(c) establishing sets of consecutive instructions for which the retention times are longer than a predetermined refresh time;
(d) adding additional instructions to the sets of consecutive instructions in order to obtain modified retention times for those sets of consecutive instructions which modified retention times are shorter than the predetermined refresh time.

It is observed that in this definition the term "terminal" is to be interpreted broadly, as including any type of computer arrangement arranged to communicate with the computer arrangement comprising the DRAM memory is defined above. Moreover, the term "terminal processor" is not intended to limit this processor to one single processor. It may include several parallel processing and communicating subprocessors, some of which are even allowed to be physically located outside the terminal.

By using such a further computer arrangement, it is certain that data to be stored by the program to be carried out by the processor need not be retained longer in the DRAM cells than the retention time of the DRAM cells. Thus, indeed no refresh circuitry is necessary for the processor to carry out its computer program.

In a further embodiment, the invention relates to a method of running a program on a computer arrangement comprising a processor and at least one memory unit connected to said processor and comprising dynamic random access memory having a predetermined retention time, the method comprising the step of running a predetermined program on said processor while temporarily storing data during a storage time in at least part of said dynamic random access memory, wherein said storage time is shorter than said retention time and said method further comprises the step of using but not refreshing said at least part of said dynamic random access memory comprising said data during said running of said program.

Moreover, the invention relates to a computer program comprising instructions executable on a computer arrangement comprising a processor and at least one memory unit connected to said processor and comprising dynamic random access memory having a predetermined retention time, the computer program while running on said computer arrangement comprising the step of temporarily storing data during a storage time in at least part of said dynamic random access memory, wherein said storage time is shorter than said retention time and said computer program further comprises the step of using but not refreshing said at least part of said dynamic random access memory comprising said data during said running of said program.

Finally, the invention relates to a computer readable medium comprising a computer program as defined above.

BRIEF DESCRIPTION OF THE DRAWINGS

The invention will be explained with reference to some drawings which are only intended to illustrate the present invention and not to limit its scope which is only limited by the appended claims.

DESCRIPTION OF THE PREFERRED EMBODIMENT

The present invention will be illustrated with reference to a smart card application. However, it is to be understood that the concept of the present invention can be used outside the field of smart cards.

Figure 1:
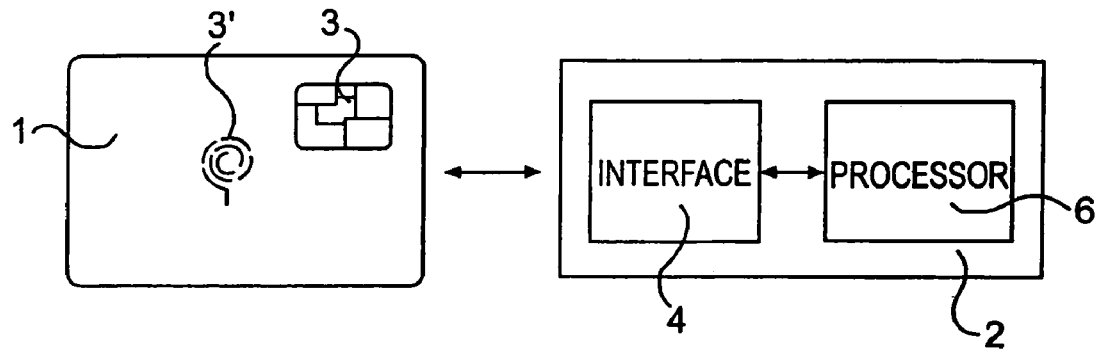
FIG. 1 shows a smart card and a terminal arranged to communicate with one another.

FIG. 1 shows a smart card 1 provided with a communication interface 3. The communication interface 3 is shown to include metallic pads. However, in contact-free embodiments, the interface comprises an antenna, e.g., a coil 3', shown in FIG. 1 with dashed lines. Such a smart card is widely known. FIG. 1 also schematically shows a terminal 2 which is arranged to communicate with the smart card 1. Therefore, the terminal 2 comprises a communication interface 4 arranged to communicate with interface 3 of the smart card 1. The technical details for such contacting are known to persons skilled in the art.

The terminal 2 comprises a processor 6 connected to the communication interface 4. Through its communication interface 4, the processor 6 is able to communicate with the processor (not shown in FIG. 1) of the smart card 1.

The processor 6 is shown to be one block. However, if preferred, the processor 6 may be implemented as several sub-processors communicating with one another each dedicated to perform a predetermined task. One or more of said sub-processors might be located outside the terminal 2. Preferably, the processor 6 is (or the sub-processors are) implemented as a computer with suitable software. However, if desired, they may be implemented as dedicated digital circuits.

Figure 2:
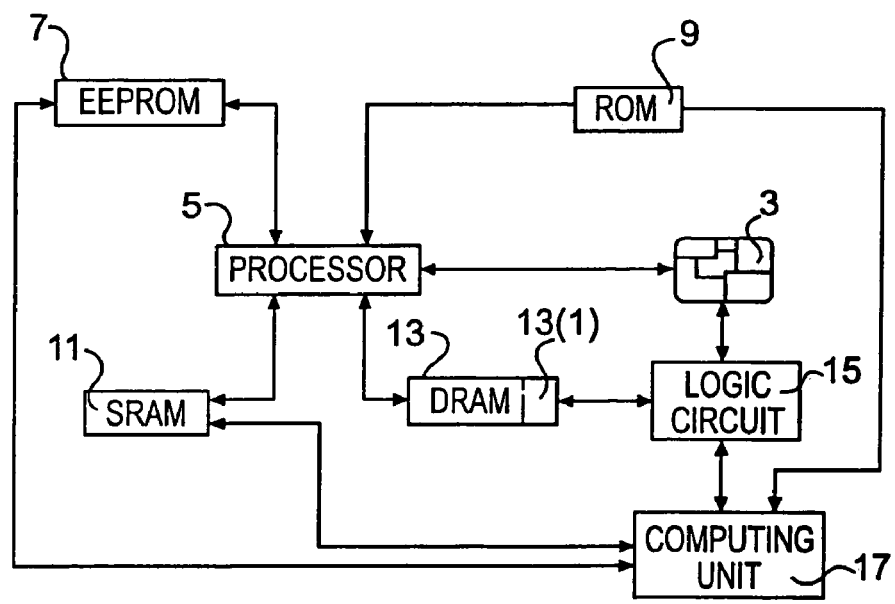
FIG. 2 schematically shows a computer arrangement using non-refreshed DRAM.

As shown in FIG. 2, the communication interface 3 of the smart card 1 is connected to a processor 5. In accordance with the invention, the processor 5 is connected to at least a first memory area 13 comprising DRAM (Dynamic Random Access Memory) cells.

In accordance with one embodiment of the present invention, at least part of the DRAM 13 is not connected to refresh circuitry. If the logic arrangement shown in FIG. 2 is used in smart card applications, preferably no refresh circuitry is applied at all. This saves space and circuitry in such a single chip computer. Of course, also in other applications one may decide to apply no refresh circuitry at all.

The DRAM 13 may be connected to a separate logic circuit 15, the operation of which will be explained hereinafter. The logic circuit 15 is connected to either a computing unit 17 or the communication interface 3. However, it is also possible that the logic circuit 15 is connected to both the computing unit 17 and the communication interface 3. Actually, processor 5, logic circuit 15 and computing unit 17 may be implemented as one processing unit. Moreover, all of the different units shown in FIG. 2 may be implemented as a single integrated chip.

The processor 5 is, preferably, also connected to a second memory area 11 comprising SRAM (Static Random Access Memory) cells.

Preferably, non-volatile memory such as EEPROM 7 connected to the processor 5 is also present. In most applications, also ROM (Read Only Memory) 9 connected to the processor 5 is provided.

If present, the computing unit 17 is, preferably, also connected to the ROM 9, the EEPROM 7, and the SRAM 11.

The ROM 9 and possibly the SRAM 11 and the EEPROM 7 contain the computer program that determines the behavior of the processor 5, and possibly also of the computing unit 17, when the processor 5 is used as a responding component in inter-computer communications through interface 3. In smart card applications, such inter-computer communications typically consist of command and response exchanges, which are constraint to a very short duration. For a contactless smart card, the time available for communication is typically in the order of 150 ms. In that short time period the smart card 1 receives one or more data transmissions that function as commands. The processor 5 processes the commands which typically include cryptographic computations and instructions to update the non-volatile memory 7. At the end of its processing, the processor 5 sends its response.

So far, the use of DRAM cells has not seriously been considered for smart card applications. They were considered to be too unreliable due to their inherent limited retention time and not to be cost-effective due to the necessary additional on-chip refresh logic circuitry to compensate for the limited retention time.

Now, contrary to the prior art, the arrangement according to the invention comprises DRAM cells 13 of which, in a preferred embodiment, at least part is not connected to refresh circuitry. Due to the field of application, the timing constraints are such that refresh circuitry is superfluous. Such timing constraints are most prominent in contactless smart card applications where due to field strength fluctuations experienced by the smart card chip, as it is moved by its user across a communication range of a terminal, all data exchange and processing must be completed in less than 150 ms.

However, also in other fields than contactless smart card applications the invention may advantageously be applied. In general, in accordance with the invention, a predetermined program is running on the processor that needs data to be temporarily stored on the dynamic random access memory 13 during a necessary storage time. This storage time for all portions of valid data during running the program, i.e., carrying out consecutive program steps, is such that it is shorter than the retention time of the dynamic random access memory 13 used. Thus, no refresh cycles for the DRAM are necessary anymore and refreshment will not be used anymore.

In practice, chips implemented according to the invention will remain having a limited RAM storage implemented with static cells to store data such as the return stack or essential security or program state values, the RAM consisting of, e.g., 128 bytes. As the basic memory cell of a DRAM is typically at least four times smaller than the basic memory cell of a SRAM, a chip in accordance with the invention can in average provide four times more memory at equal costs.

Figure 3:
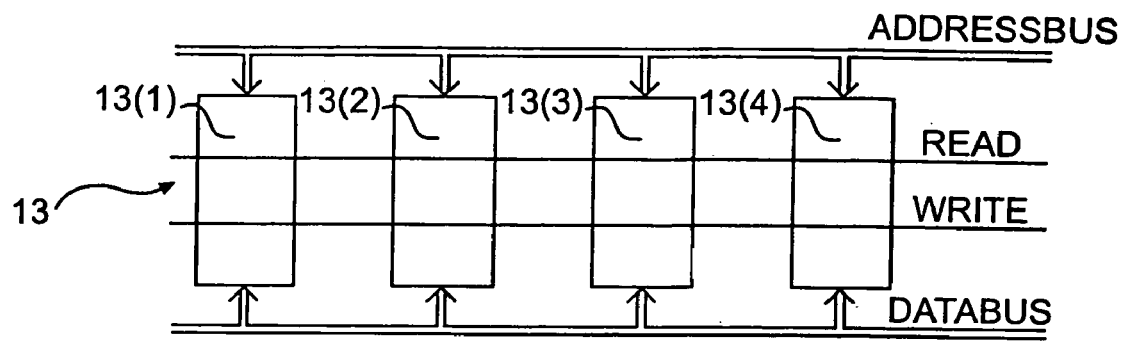
FIG. 3 schematically shows a division of the DRAM into four memory banks.

A further advantage of the present invention can be obtained by realizing the DRAM 13 not as a single controlled array but as two or more independently controlled simultaneously accessible banks 13(1), 13(2), 13(3), 13(4), as shown in FIG. 3. FIG. 3 shows four such banks, however, it is to be understood that the number of banks may be different. Using a number of different banks would facilitate the use of additional logic circuitry on a single chip computer arrangement. Such additional logic circuitry may relate to a coprocessor in the form of an additional computing unit 17 which is arranged to carry out additional cryptographic computations while using only one of the banks, e.g., bank 13(1).

To that end all banks 13(1) . . . 13(4) are connected to an address bus, a data bus and read and write lines (see FIG. 3). The signals carried by these different lines are known to a person skilled in the art. By means of the address bus, the computing unit 17 is able to address memory cells in bank 13(1) whereas these memory cells are, then, not accessible to processor 5. By providing a separate computing unit 17, computations can be carried out simultaneously, thus, ensuring that a process can be carried out in the required timing constraints of e.g. 150 ms.

It is observed that FIG. 3 is very schematic. The arrangement is such that at least one of the memory banks 13(1) . . . 13(4) can be selected independently from the other memory banks. This can be done by multiplexing techniques on the address bus, data bus, read and write lines. However, this may also be done by providing separate address busses, data busses, read and write lines for each independent memory bank, as is known to persons skilled in the art.

Instead of or in addition to using a computing unit 17, which accesses the DRAM 13 through the logic circuit 15, a DMA (Direct Memory Access) communication procedure can be provided for. To that end, the logic circuit 15 is, then, connected to the communication interface 3 such that an external processor (e.g., processor 6 of the terminal 2) is able to directly access DRAM 13. Preferably, through such a DMA communication procedure, the external processor is only able to obtain access to one of the banks 13(1) . . . 13(4). This all could increase the speed of execution and allow for reduced power consumption. Non-traditional CPU design, e.g. RISC (=Reduced Instruction Set Computer), might also benefit from multi-banked RAM.

Figure 4:
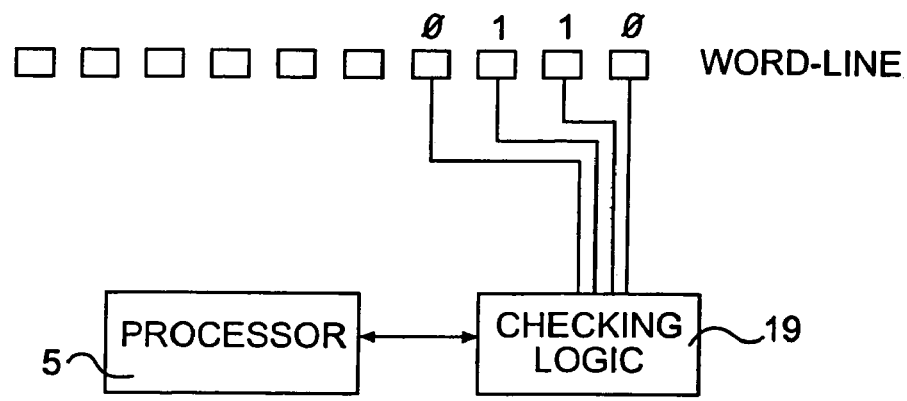
FIG. 4 schematically shows using some memory cells in a word-line arrangement for checking the proper operation of the DRAM cells.
Figure 5:
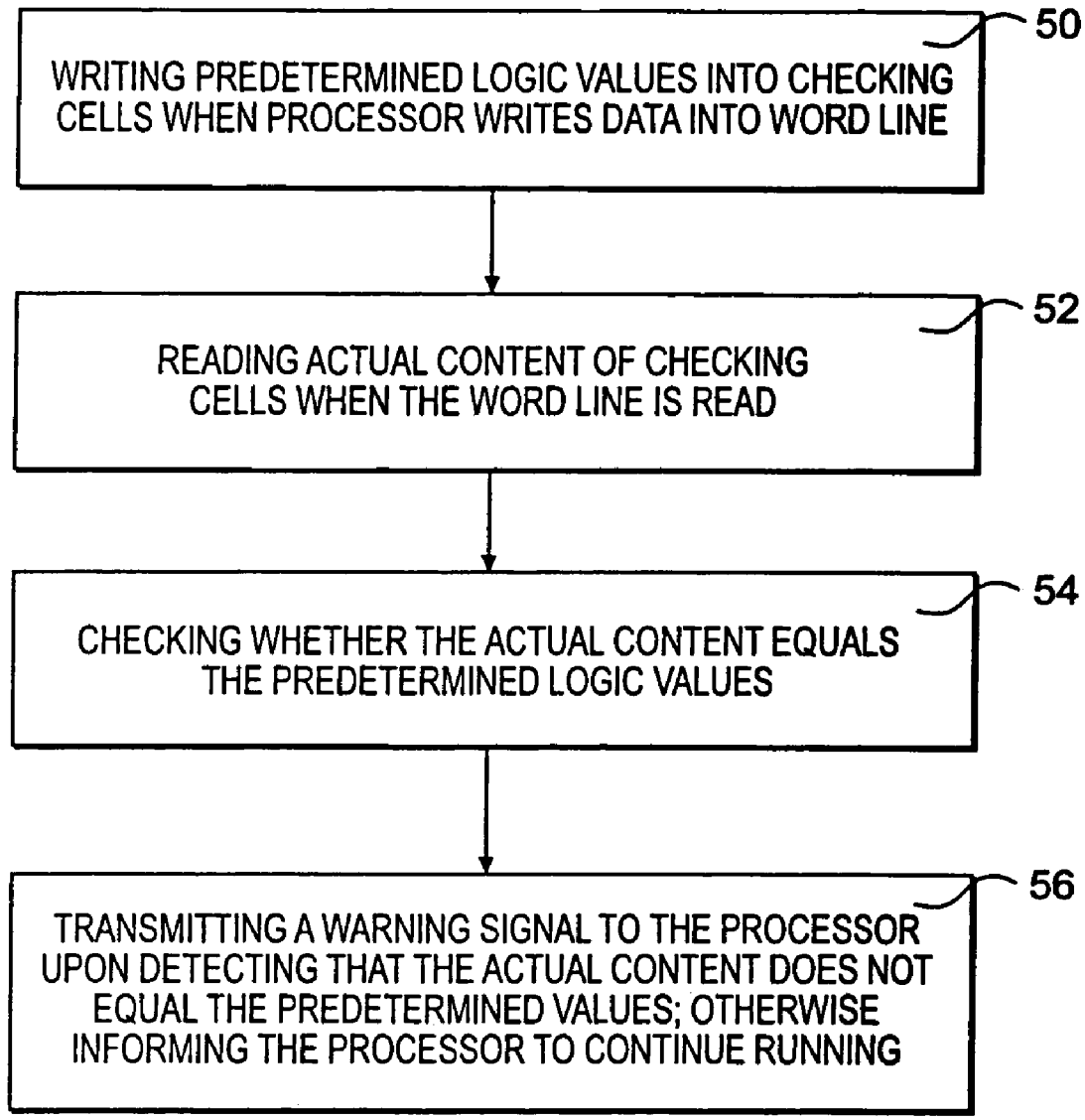
FIG. 5 shows a flow diagram of steps to be taken to check whether or not the content of the DRAM cells is still valid.

As customary, the DRAM cells may be organized into a rectangular structure consisting of a number of word-lines, each containing a number of bit memory cells to store data for a multiple of bytes. One such word-line is schematically shown in FIG. 4. To safeguard against unexpected longer storage periods than the maximum retention time of the individual DRAM cells which might result in using data incorrectly retrieved from the DRAM cells, each word-line in the memory area may comprise one or more "witness" storage cells. FIG. 4 shows a situation in which four such "witness" storage cells at the right-hand side of the word-line are used. As shown in step 50 of FIG. 5, these four storage cells, at the outset of a write action into the word-line, are provided with a predetermined pattern of data: in FIG. 4 this pattern is 0 1 1 0. Of course, an other pattern of predetermined logic values may be used. Also, the number of "witness" storage cells may differ. As shown in step 52 of FIG. 5, the "witness" cells are read each time data stored in the word-line cells is read by processor 5 or by any other additional logic processor, such as computing unit 17 (not shown in FIG. 4). Checking logic 19 connected to processor 5 (or any other additional processor present) is arranged to check whether the data pattern read from the "witness" cells still equals the predetermined logic pattern; step 54 in FIG. 5. If the predetermined logic pattern is not present anymore, the checking logic 19 will send a warning signal to the processor 5 (or any other processor concerned); step 56. Such a warning signal will, then, be interpreted as a failure of any data read by the processor 5 (or any other processor concerned). An appropriate execution exception then prevents normal completion of the actual program. If no failure has been detected, the actual program can continue running. This mechanism may be deployed to fend off attacks against the chip's integrity which might be mounted by artificially elongating the processing time to cause incorrect data to be used in computations.

Although, in FIG. 4, the checking logic 19 is shown as a separate unit it is to be understood that the checking logic 19 may be part of the processor 5 (or any other processor).

The "witness" storage cells may be part of the normally designed word-line. However, alternatively, a normally designed word-line may be extended by such "witness" storage cells. In one embodiment, these "witness" storage cells are designed such that their data retention times are significantly shorter, e.g. 5–10%, than the data retention times of the other memory cells on the same word-line. Thus, upon detecting that the content of the "witness"

storage cells is correct it is even more likely that the content of the other storage cells of the same word-line is still correct by the time of reading.

In a further alternative embodiment, after having manufactured the DRAM cells it is tested which memory cells in a word line show the shortest retention times. One or more of these cells may then be used as "witness" cells.

To support obtaining the benefits of the invention and to ascertain conformance to the timing constraints of the DRAM 13, the software loaded in e.g. ROM 9 or EPROM 7 may be preprocessed and optimized with respect to storage timing by processor 6 of terminal 2. The processor 6 is arranged to compile that software. During preprocessing, the processor 6 analyzes the time period necessary for the processor 5 to carry out each instruction of the software and all retention times necessary for the processor 5 (or any other processor like the computing unit 17 using the DRAM 13) to temporarily store data in the DRAM 13 during running the software.

Figure 6:
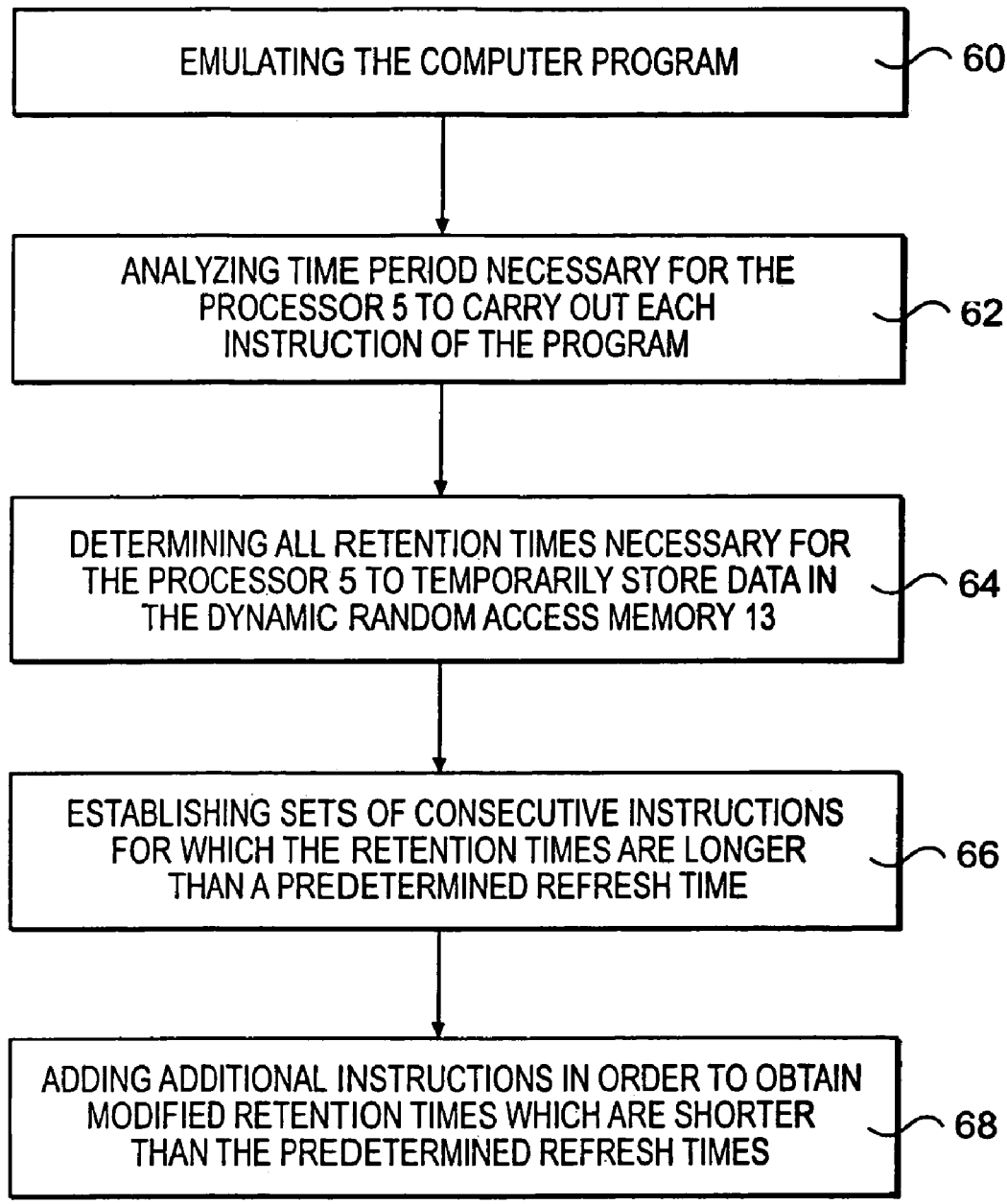
FIG. 6 shows a flow diagram of steps to be taken to amend a computer program such that the maximum retention times of data in memory cells are shorter than a specified retention time of the DRAM cells.

FIG. 6 shows steps carried out by processor 6 for such a preprocessing program. After having emulated the program, step 60, the processor 6 analyzes all sections of executable code of the software, step 62, and computes the time between updates of stored data used by the code sections, step 64. Then, the processor 6 establishes sets of consecutive instructions in the program for which the retention times in the DRAM 13 would be longer than the specified refresh time of the DRAM 13, step 66. Known techniques for code rearrangement, such as unrolling program loops and inserting additional instructions to explicit read-and-then-write storage locations, i.e. a kind of artificial refresh operation, are used to guarantee that all data stored by the software in the DRAM 13 is used well before the end of the memory cell retention period, step 68. Without using traditional refresh circuitry, then, still all DRAM cells are refreshed in time.

Above, the invention has been illustrated with reference to an embodiment in which the Dram 13 is physically not connected to a refresh circuitry. However, the principles of the invention may also be applied by disabling the refresh functionality of an existing computer arrangement comprising a refresh circuitry. In such an embodiment, existing refresh circuitry need not be taken away.

The invention claimed is:

1. A terminal provided with a terminal processor and a terminal communication interface connected to said terminal processor and arranged for communicating with a computer arrangement comprising a processor, a communication interface and at least one memory unit, said communication interface and said at least one memory unit being connected to said processor, said at least one memory unit comprising memory for storing a computer program with a predetermined sequence of instructions and dynamic random access memory, said computer arrangement being arranged to use but not to refresh at least part of said dynamic random access memory while running said program, wherein said terminal processor is arranged to carry out the following steps:
  (a) emulating said computer program;
  (b) analyzing time period necessary for the processor of the computer arrangement to carry out each instruction of said sequence of instructions and determining all retention times necessary for the processor to temporarily store data in said at least part of said dynamic random access memory during carrying out said sequence of instructions;
  (c) establishing sets of consecutive instructions for which said retention times are longer than a predetermined refresh time
  (d) adding additional instructions to said sets of consecutive instructions in order to obtain modified retention times of those sets of consecutive instructions which modified retention times are shorter than said predetermined refresh times.

2. The terminal of claim 1, wherein adding additional instructions includes:
  adding read and write instructions to the sets of consecutive instructions.

3. A method for processing instructions using a Dynamic Random Access Memory (DRAM), comprising:
  providing a DRAM having a word line of memory cells including a set of witness cells;
  running a program by a processor that writes data into the word line of the DRAM, the processor arranged to use but not to refresh at least part of the DRAM while running the program,
  writing a predetermined data pattern in the witness cells in response to the processor writing the data into the word line of the DRAM;
  reading data from the witness cells in response to a determination that the processor reads data from the word line;
  comparing the data read from the witness cells to the predetermined data pattern; and
  preventing execution of the program when the witness cell data does not match the predetermined data pattern.

4. The method of claim 3, further including:
  continuing execution of the program when the witness cell data matches the predetermined data pattern.

5. The method of claim 3, further including:
  testing the word line to identify a memory cell having a shortest data retention time in relation to other memory cells of the word line; and
  designating the memory cell having the shortest data retention time as a witness cell.

6. The method of claim 3, further including:
  providing the processor and DRAM on a smart card.

7. A method for processing a software program including instructions for execution by a processor that uses a Dynamic Random Access Memory (DRAM), comprising:
  determining a corresponding time period for the processor to execute each instruction of the software program;
  determining a corresponding time period between updates of data stored in the DRAM and used by the software program instructions when executed by the processor;
  determining a set of instructions in the software program that require data to be retained in the DRAM longer than a retention time of the DRAM, wherein the retention time is a period of time that data is retained in the DRAM when no refresh operation is used; and
  rearranging the determined set of instructions to ensure data stored in the DRAM is used the software program instructions before the end of the retention time of the DRAM.

8. The method of claim 7, wherein rearranging the determined set of instructions includes at least one of:
  unrolling program loops in the set of instructions; and
  adding instructions to the set of instructions.

9. The method of claim 8, wherein adding instructions includes:
  adding read and write instructions to the set of instructions to perform an artificial refresh operation of data used by the set of instructions.

10. The method of claim 7, wherein the processor and DRAM are each located within a smart card.

11. A system for processing instructions using a Dynamic Random Access Memory (DRAM), comprising:

a DRAM having a word line of memory cells including a set of witness cells;

a processor that executes a program that writes data into the word line of the DRAM, the processor arranged to use but not to refresh at least part of the DRAM while executing the program, and a logic component configured to compare data stored in the set of witness cells to a predetermined data pattern previously written into the set of witness cells, and provide an indication to the processor when the logic determines the stored witness cell data does not match the predetermined data pattern, wherein the processor is configured to prevent further execution of the program in response to receiving the indication.

12. The system of claim 11, wherein the processor is configured to continue execution of the program when no indication is received from the logic.

13. The system of claim 11, wherein the predetermined data pattern is written into the set of witness cells when the processor writes data in the word line.

14. The system of claim 11, wherein the processor is configured to read the data stored in the set of witness cells when the processor reads data stored in the word line.

15. The system of claim 11, further including a second processor that is configured to read the data stored in the set of witness cells when the processor reads data stored in the word line.

16. The system of claim 11, wherein the logic component is configured as part of the processor.

17. The system of claim 11, wherein the set of witness cells are designed such that their data retention time is significantly shorter than the data retention times of other memory cells in the word line.

18. The system of claim 11, wherein the word line is previously tested to identify a set of memory cells having a shortest data retention time in relation to other memory cells of the word line, and wherein the identified set of memory cells having the shortest data retention time are used as the set of witness cells.

19. The system of claim 11, wherein the system is a smart card.

20. A system for processing a software program including instructions, comprising:

a first processor that executes the software program and uses a Dynamic Random Access Memory (DRAM); and a second processor configured to:

determine a corresponding time period for the first processor to execute each instruction of the software program, determine a corresponding time period between updates of stored data in the DRAM used by the software program instructions when executed by the first processor, determine a set of instructions in the software program that require data to be retained in the DRAM longer than a retention time of the DRAM, wherein the retention time is a period of time that data is retained in the DRAM when no refresh operation is used, and rearrange the determined set of instructions to ensure data stored in the DRAM is used the software program instructions before the end of the retention time of the DRAM.

21. The system of claim 18, wherein the second processor rearranges the determined set of instructions by at least one of:

unrolling program loops in the set of instructions; and adding new instructions to the set of instructions.

22. The system of claim 19, wherein the second processor is configured to add read and write instructions to the set of instructions to perform an artificial refresh operation of data used by the set of instructions.

23. The system of claim 18, wherein the processor and DRAM are each located within a smart card.

24. A terminal comprising:

a terminal processor; and a first interface that communicates with a second interface included on a separate computer arrangement including a DRAM having a word line of memory cells including a set of witness cells, a processor that executes a program that writes data into the word line of the DRAM, the processor arranged to use but not to refresh at least part of the DRAM while executing the program, and a logic component configured to compare data stored in the set of witness cells to a predetermined data pattern previously written into the set of witness cells, and provide an indication to the processor when the logic component determines the stored witness cell data does not match the predetermined data patter, wherein the processor prevents further execution of the program in response to receiving the indication.

* * * * *

UNITED STATES PATENT AND TRADEMARK OFFICE
CERTIFICATE OF CORRECTION

| | | |
|---|---|---|
| PATENT NO. | : 7,197,596 B2 | Page 1 of 1 |
| APPLICATION NO. | : 11/345519 | |
| DATED | : March 27, 2007 | |
| INVENTOR(S) | : Eduard Karel De Jong | |

It is certified that error appears in the above-identified patent and that said Letters Patent is hereby corrected as shown below:

Claim 1, col. 7, line 67, "time" should read --time;--.

Claim 7, col. 8, line 54, "data stored in the DRAM is used the software program" should read --data stored in the DRAM is used by the software program--.

Claim 24, col. 10, line 45, "patter" should read --pattern--.

Signed and Sealed this

Fifth Day of June, 2007

JON W. DUDAS
*Director of the United States Patent and Trademark Office*